US007197571B2

(12) United States Patent
Sarkar et al.

(10) Patent No.: US 7,197,571 B2
(45) Date of Patent: Mar. 27, 2007

(54) SYSTEM AND METHOD FOR IMPROVING BACKUP PERFORMANCE OF MEDIA AND DYNAMIC READY TO TRANSFER CONTROL MECHANISM

(75) Inventors: Prasenjit Sarkar, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 10/035,754

(22) Filed: Dec. 29, 2001

(65) Prior Publication Data

US 2003/0126282 A1    Jul. 3, 2003

(51) Int. Cl.
    *G06F 15/16*    (2006.01)
(52) U.S. Cl. ............... 709/237; 709/204; 709/219; 709/236; 370/230; 370/236; 710/3
(58) Field of Classification Search ............... 709/237, 709/219, 236, 204; 710/3; 370/230, 236
    See application file for complete search history.

(56) References Cited

U.S. PATENT DOCUMENTS

| | | | | |
|---|---|---|---|---|
| 6,076,113 | A | 6/2000 | Ramanathan et al. | 709/235 |
| 6,078,564 | A | 6/2000 | Lakshman et al. | 370/235 |
| 6,205,120 | B1 | 3/2001 | Packer et al. | 370/235 |
| 6,205,148 | B1 | 3/2001 | Takahashi et al. | 370/401 |
| 6,219,712 | B1 | 4/2001 | Mann et al. | 709/235 |
| 6,400,730 | B1 * | 6/2002 | Latif et al. | 370/466 |
| 6,865,617 | B2 * | 3/2005 | Zeidner et al. | 710/3 |
| 2003/0056000 | A1 * | 3/2003 | Mullendore et al. | 709/236 |
| 2003/0084209 | A1 * | 5/2003 | Chadalapaka | 710/5 |

OTHER PUBLICATIONS

Satran, Julian, "iSCSI—a SCSI over TCP mapping," IETF-48, IBM Research Lab in Haifa,entire doctment.*
Networking the World's Business Data, "In Brief: Optimizing Storage Data Transfers over Long Distance WAN Links with Fast Write," McDATA, printed Mar. 14, 2005.*
Simitci, H. et al. "Evaluation of SCSI over TCP/IP and SCSI Over Fiber Channel Connections." IEEE, 2001, pp. 87-91.*
Re: OT 1.1.2 trace—delayed Ack, printed from <http://tcp-impl.grc.nasa.gov/list/archive/0276.html>.*

(Continued)

*Primary Examiner*—David Wiley
*Assistant Examiner*—Alina Boutah
(74) *Attorney, Agent, or Firm*—Samuel A. Kassatly

(57) ABSTRACT

A system and method improve the performance of block storage over a network with asymmetric traffic by reducing the exchange of control messages between clients and servers. Before the source and the target begin exchanging data, they need to exchange control messages first to ensure the integrity of the data transfer operations. The acknowledgment messages affect the performance of backup operations when using a storage protocol such as SCSI over a reliable wide-area network protocol such as TCP/IP. SCSI protocol level and TCP/IP protocol level acknowledgment messages are combined to reduce CPU utilization at both the source and the target systems, which improves the overall system throughput and performance, and also reduces the bottleneck at the network level.

26 Claims, 10 Drawing Sheets

OTHER PUBLICATIONS

W. Noureddine and F. Tobagi, "Selective Back-Pressure in Switched Ethernet LANs," in Proceedings of GlobeCom, 1999.

Craig Matsumoto, "Proposals Seek to Move SANs Off Fibre Channel," EE Times, May 25, 2000, also available on the Internet at URL: http://www.edtn.com/story/tech/0EG200005250009-T (printed Jan. 17, 2002).

P. Buonadonna et al., "An Implementation and Analysis of the Virtual Interface Architecture," available on the Internet at URL: http://www.supercomp.org/sc98/TechPapers/sc98_FullAbstracts/Buonadonna893/INDEX.HTM (printed Jan. 17, 2002).

IPFC working Group, Internet Draft, "Fibre Channel Over IP (FCIP)," available on the Internet at URL: http://www.watersprings.org/pub/id/draft-ietf-ipfc-fcoverip-02.txt (printed Jan. 17, 2002).

Julian Satran et al., "IPS Internet Draft, iSCSI," available on the Internet at URL: http://search.ietf.org/Internet-drafts/draft-ietf-ips-iscsi-09.txt (printed Jan. 17, 2002).

* cited by examiner

Processing at the Initiator

No Congestion at the Server

SCSI Systems with no RTT

SCSI Systems With RTT

SYSTEM AND METHOD FOR IMPROVING BACKUP PERFORMANCE OF MEDIA AND DYNAMIC READY TO TRANSFER CONTROL MECHANISM

FIELD OF THE INVENTION

The present invention relates to system and method for improving the performance when backing up media and data over networks using storage and network transport protocols. The performance improvement is achieved by reducing the exchange of control messages between clients and servers. Specifically, SCSI protocol level and TCP/IP protocol level ACKs are combined to reduce CPU utilization at both the source and the target systems, which improves the overall system throughput and performance, and also reduces the bottleneck at the network level.

BACKGROUND OF THE INVENTION

Recent years have witnessed major advances in the field of computer systems technologies along with the major breakthroughs in the hardware field such as in the design of microprocessors, memory, and data transfer bus. These advances in technologies along with the fierce competition in the free marketplace have reduced the price of computing, and made it affordable to the masses. Electronic computing is no longer reserved for large companies, maintaining customers' accounts in banks, or performing theoretical or engineering research.

The computing power is no longer centralized in a central mainframe, and the clients are no longer the dumb terminals they used to be, whose only function was to submit jobs to be processed at the central host. Nowadays, the personal computer, or PC, is a rich machine that can be both the client and the host, and is becoming very affordable.

However, despite all these advances, the technology is far from perfect. PCs are known for sudden crashes that destroy data that was not saved in time to the local disk drive. The disk drives are mechanical devices that have a limited life, and depending on how they are used are known to crash and all the data that was saved on them is permanently lost. In addition, the popularity of the internet and electronic mail have made it possible to spread electronic viruses that destroy data on the hard drives. It has become necessary to back up the data saved on the hard drives, and retrieve it later when needed. This is particularly important for businesses that store customer and billing information.

Companies of all sizes have now invested in powerful PCs that act as a central repository of data. Individual client machines that are now connected via networks back up and store their data in these central servers. In actuality, certain number of clients PCs will be connected via a network to a server using defined protocols such as TCP (Transmission Connect Protocol). When a PC communicates with the server, it exchanges messages to ensure the integrity of the communication. It is when several PCs attempt to store data at the server simultaneously, that bottlenecks arise, and the throughput and performance slow down to a halt. A need therefore arises for combining these messages, and for reducing the number of transmission, thereby alleviating some of the network load.

SUMMARY OF THE INVENTION

The system and method of the present invention improve the performance of data backup operations across wide-area networks, with asymmetric data flow, using a storage protocol, such as SCSI: Small Computer System Interface, over a reliable wide-area network protocol with acknowledgments such as TCP. That is, the data flows primarily in one direction from the source to the target.

A typical environment in which data can be flowing primarily in a single direction, is when initiators are performing backup operations, including write operations, at the targets. For example, thousands of users could be trying to concurrently backup their workstations' disk drives across the wide-area network at the same storage service provider. The users will continue to primarily use the hard disks present in their local computers for reading and writing their data, but they will periodically backup the data stored on these hard disks to a storage service provider which acts as a data repository.

Thus, the only data flowing in the opposite direction is the storage protocol acknowledgments indicating the status of the write operation completion. Though the present invention will be described herein based on the SCSI storage protocol and the TCP/IP wide-area network protocol, it should be clear that the present invention is similarly applicable to any storage area network protocol operating over a reliable wide-area network protocol with acknowledgment, without departing from the scope of the present invention.

Before data at the source is transmitted to the server, it is first moved to a buffer, a faster form of storage. Similarly, the target first receives the transmitted data into its buffers, before it is written to permanent storage. Using buffers at both the source and target machines is meant to speed up the Input/Output (I/O) operations. These I/O operations are typically much slower than the processing speed of the CPU, and often they become the bottlenecks as the CPU pauses, and waits until the completion of the I/O operations. Before the source and the target machines begin exchanging data, they need to exchange control messages first to ensure the integrity of the data transfer operations. The following acknowledgment messages affect the performance of backup operations when using a storage protocol such as SCSI over a reliable wide-area network protocol such as TCP/IP:

RTT Message in a Wide-Area Environment: In the SCSI protocol, before a host can send data that needs to be written on persistent storage at the target, the client host expects a Ready to Transfer (RTT) message from the target indicating that the target is ready to accept the data. The target sends the RTT message to indicate that it has enough buffer space to accept the write data from the client host. In an environment where multiple hosts are simultaneously writing to the same target, it is necessary to have the RTT message from the target to ensure that the target buffer does not overflow. However, in a wide-area network situation, the RTT message can potentially delay the execution of the write command due to unexpected latencies. Therefore, the challenge is to prevent the target buffer overflow without incurring the delay due to the RTT message.

TCP ACK (or acknowledgment): SCSI is a command-response protocol. That is, the command completion response (SCSI ACK) from the target itself is an indicator whether the target actually received the command. However in the TCP/IP protocol, the end node receiving the message, sends an acknowledgment message (ACK) to the node that sent the message. The TCP ACK satisfies two key objectives:

1. The ACK mechanism is used to make TCP/IP a reliable protocol. That is, the sender re-transmits a message unless it receives an ACK from the destination node within a specified time limit.

2. The ACK message is also used for TCP/IP flow control mechanism. That is, the message sender can only advance the TCP sliding window, i.e. the next chunks of data to be transferred, after it receives the TCP ACK message from the target.

TCP ACKs are usually piggybacked along with other messages that are sent from the target to the host. However, in the backup environment, where the data flow is asymmetric in nature, there is not much data going in the other direction for the TCP ACK to be piggybacked on. Therefore, the target has to send an ACK for the TCP message, and a separate message is used to send the SCSI ACK to the host. Sending separate TCP ACK and SCSI ACK messages increases the CPU utilization of the target (especially when this is done for all of the hosts that are simultaneously trying to backup their data). This leads to a deterioration in performance of the target server.

SCSI ACKs: The backup environment is an environment where the write operations are streamed from the host to the target. In this environment, it is desirable not to send individual SCSI ACKs from the target to the host at the completion of each of the block write commands. Ideally, it would be nice if SCSI had a selective ACK mechanism similar to the TCP cumulative ACK mechanism, described below, where a single ACK is sent for a set of messages. This would reduce the number of explicit SCSI ACK messages that the target needs to send. This, in turn, would reduce the CPU utilization at the target and is desirable when the target is simultaneously dealing with many hosts.

A further implementation of the present invention is constructing storage area networks (SANs) that connect many servers or network attached storage (NAS) devices, and that use the SCSI storage protocol over TCP/IP transmission protocol over gigabit Ethernet, a data transmission standard. The goal being to contain network hardware and maintenance costs when implementing SANs by using the same network hardware (network interface cards, and routers) for both storage and wide-area network traffic.

BRIEF DESCRIPTION OF THE DRAWINGS

The above and further objects, features and advantages of invention will become clearer from the more detailed description read in conjunction with the following drawings, in which.

DETAILED DESCRIPTION OF PREFERRED EMBODIMENTS

Figure 1:
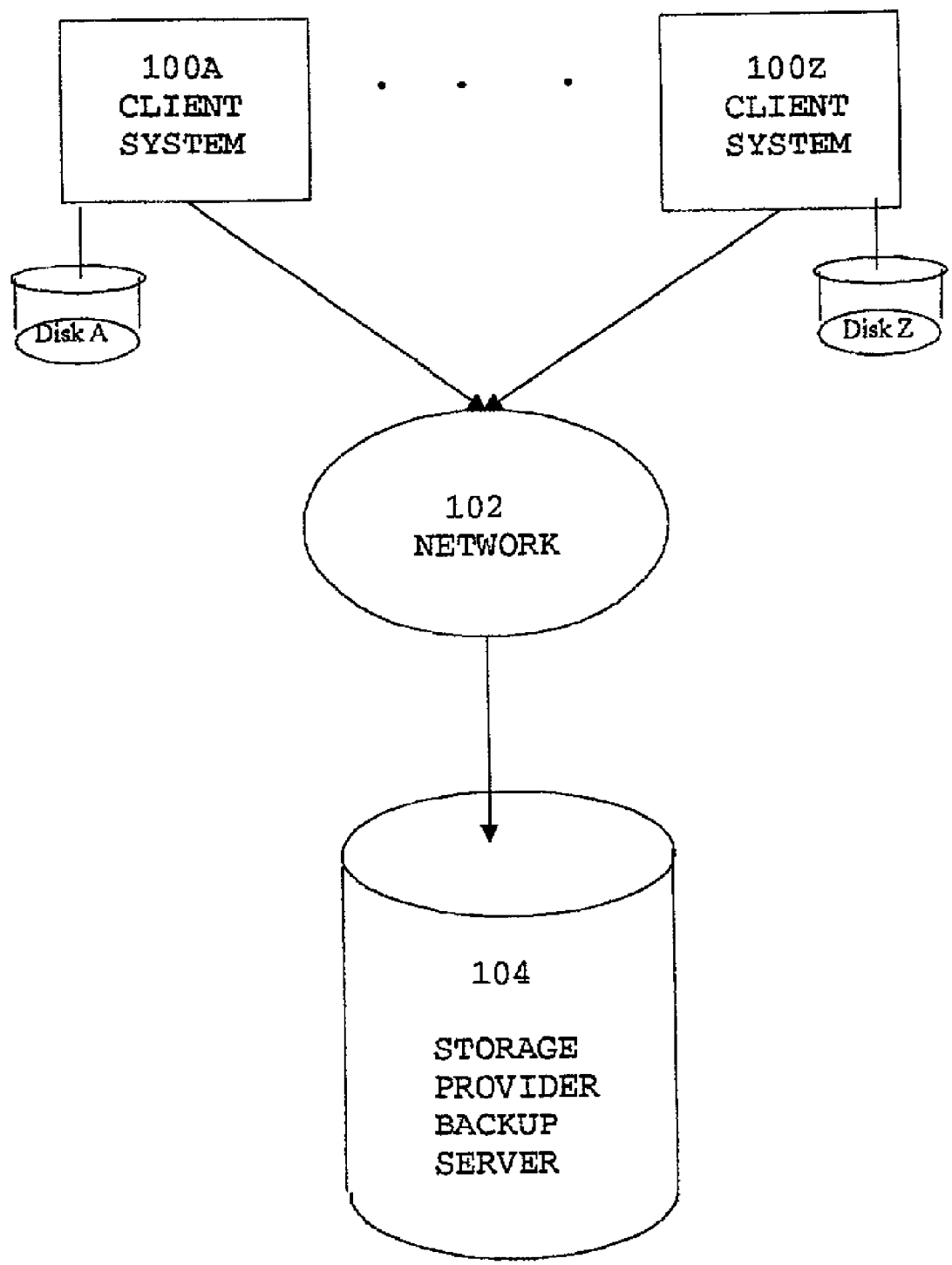
FIG. 1 is an exemplary block diagram of a networked storage system according to the present invention.

A networked storage system 10 of the present invention is illustrated in FIG. 1. The system 10 generally includes a plurality of client systems 100A–100Z, a network 102, and a target backup system 104. The client systems 100A–100Z are communicatively connected to target system 104 via the network 102. The client systems 100A–100Z have their own private data storage on private disk drives. These private data storage are backed up to the target system 104 by streaming the data over the network 102. The data that is backed up at the target system 104 can be restored on demand to each of the client systems 100A–100Z over the network 102. Many types of data may be stored at the target system 104, such as database files, media files, personal folders, and executable files. The system 10 includes a plurality of executable instruction codes stored on a computer-readable medium.

Figure 2:
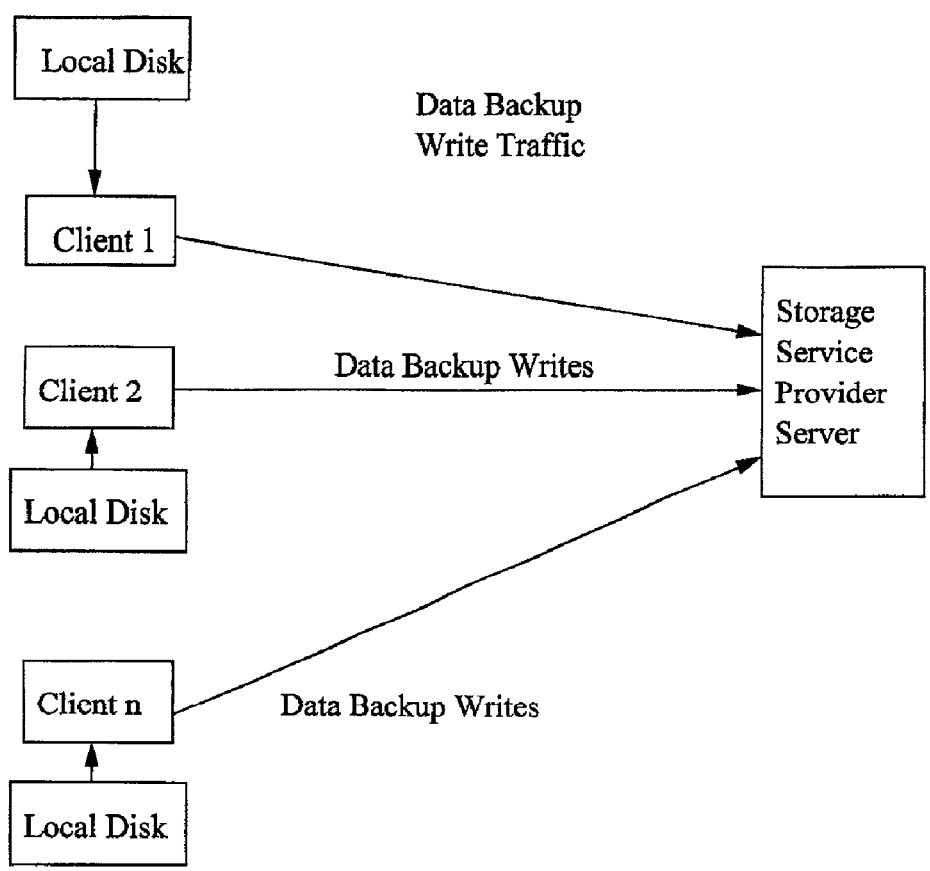
FIG. 2 is a process flowchart that illustrates the asymmetric data traffic concept.

FIG. 2 illustrates the concept of asymmetric data traffic in which the data flows primarily in one direction from a source 200 to a target service provider server 210 that includes the target backup system 104. Data from the source 200, i.e., clients 100A–100Z, is shown flowing primarily in a single direction, where initiators are performing backup operations, including write operations, at the target or target service provider server 210.

Figure 3:
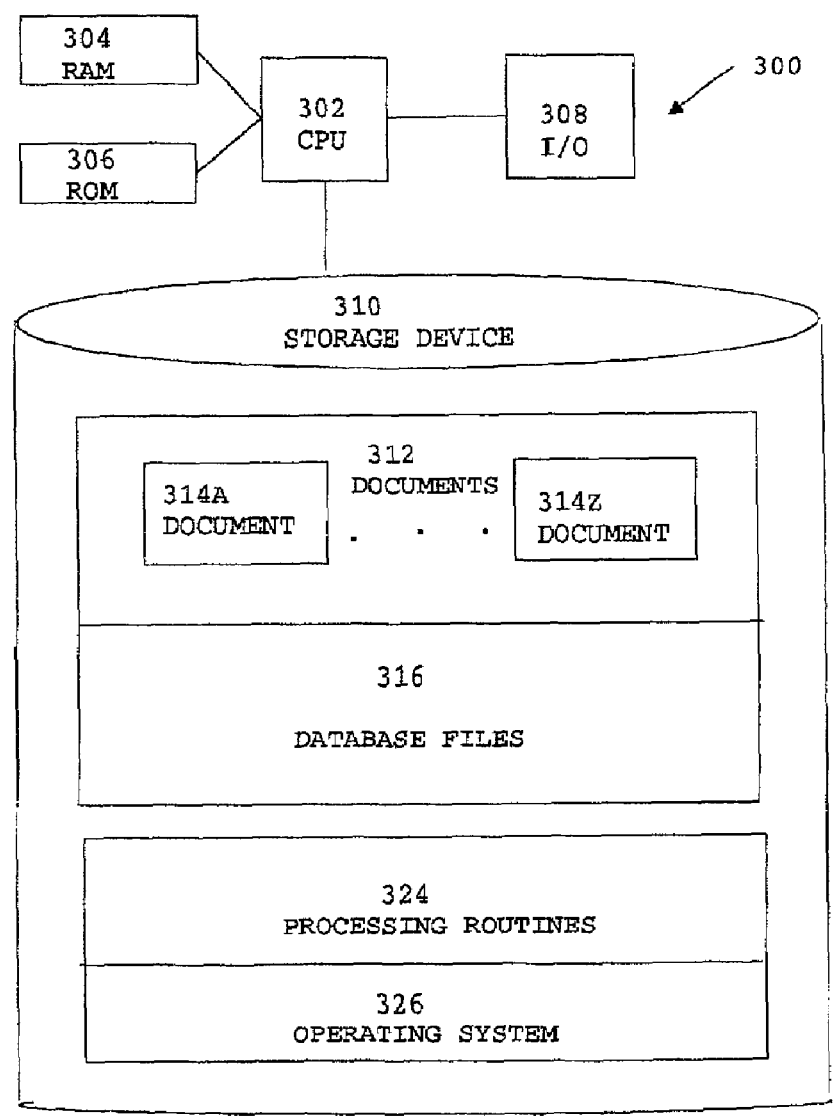
FIG. 3 is an exemplary block diagram of a computer system in which the present invention may be implemented.

An exemplary system 300 that resides, for example, at the target service provider server 210 may be implemented as shown in FIG. 3. System 300 includes central processing unit (CPU) 302, which is connected to random access memory (RAM) 304, read-only memory (ROM) 306, input/output devices (I/O) 308, and storage device 310. CPU 302 may include, for example a microprocessor, a mini-computer, or a mainframe processor.

RAM 304 and ROM 306 store program instructions that are executed by CPU 302 and data that is used during program execution. I/O devices 308 may include any devices used to input data to system 300, such as a keyboard, mouse, trackpad, trackball and graphics tablet, to output data from system 300, such as a display and a printer, and to both input and output data, such as a modem and a network adapter.

Storage device 310, which stores data used by the present invention, may comprise, for example, a random-access memory, a magnetic disk and/or optical disk, and may also comprise a magnetic tape. Storage device 310 includes documents storage 312, which includes one or more documents 314A–314K. Each document is typically stored as one or more files. Each document typically contains at least some text, but may also contain other types of information, such as numeric data, graphics, images, audio, or video.

Database files 316 contain data that is stored in database tables. Storage device 310 includes processing routines 324 that include program software routines to be executed by CPU 302. Processing routines 324 are usually, but not necessarily, written in a high-level programming language, such as JAVA, C, or C++ programming languages. If written in JAVA, processing routines 324 run on top of the JAVA virtual machine. Storage device 310 also includes operating system 326.

Figure 4:
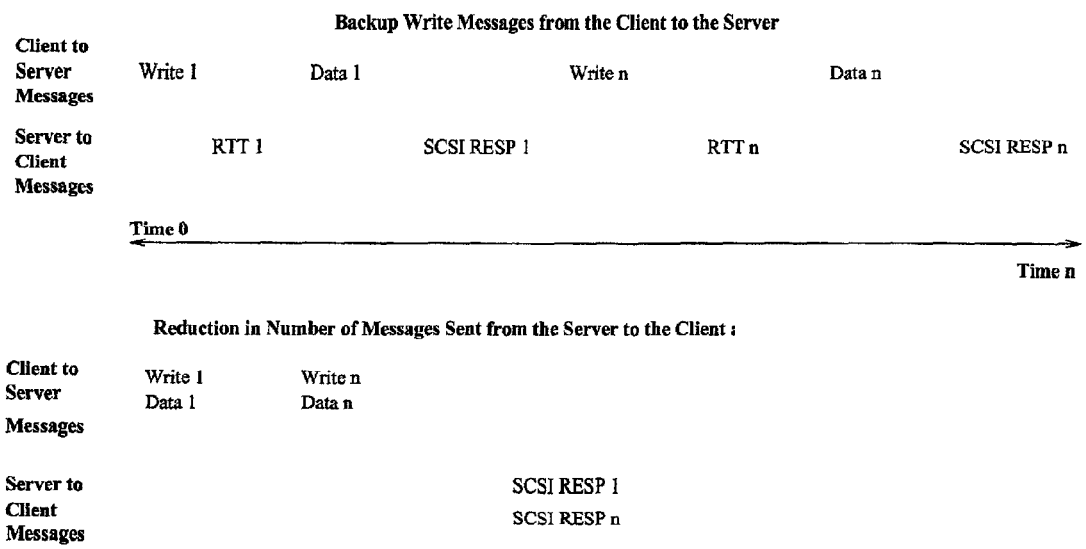
FIG. 4 is a time line that exemplifies the advantage of the current invention, illustrating a reduction in the number of messages from a target to an initiator.

An exemplary solution for the task described above "RTT Message in a Wide-Area Environment" is illustrated in FIG. 4. This solution aims to reduce congestion at the server by suppressing the RTT messages. The purpose of the RTT messages, sent form the server to the client is to ensure that the SCSI buffer that receives the data at the server does not overflow.

First, the client sends a Write Command, along with a number representing the amount of data to write, to the server indicating its intention to do a write operation. The server receives the Write Command (block 510, FIG. 5), and then checks its buffer space to ensure that it has enough space to receive the data, in which case it replies with an RTT message to the client. Upon receiving the RTT message, the client starts the transmission of data in the form of a Write Data operation.

By suppressing the RTT message (block 525, FIG. 5), there is a possibility that the buffer may overflow, and subsequently the data will be lost. However, by using the TCP/IP protocol, this concern is alleviated. In the TCP/IP protocol, the source keeps the transmitted data in its buffers until it receives an acknowledgment from the target that it successfully received the data. Once this acknowledgment is received, the source will flush its buffers. If the target buffer of the SCSI overflows, the data is not successfully received at the server, and the server will not send a successful acknowledgment to the source. Since the transmission protocol is TCP/IP, the source will have to retransmit the data again to the target. Thus, suppressing the RTT messages helps improve both the latency and bandwidth of the overall system, as the Write Command and the subsequent transmission of the data from the source are now combined in a single operation.

Figure 5:
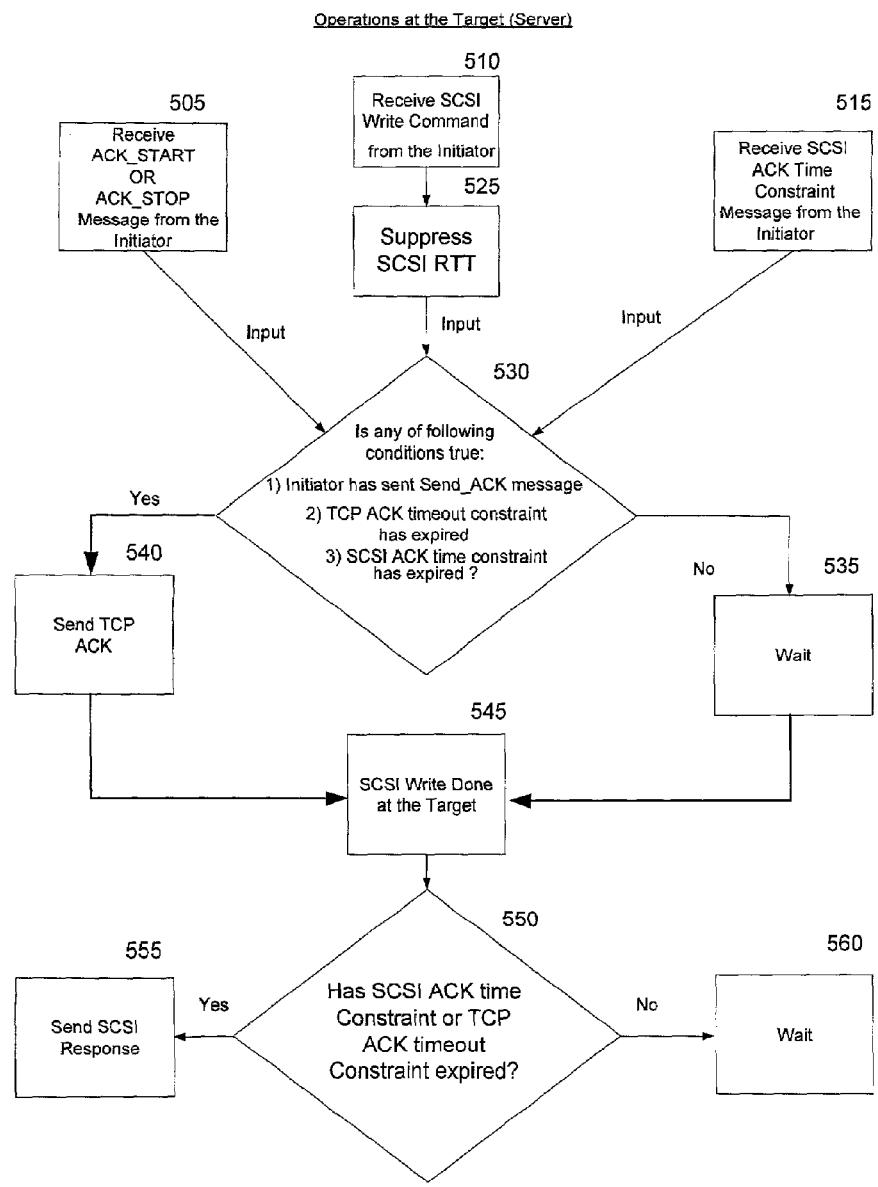
FIG. 5 is a flow chart that illustrates a capture algorithm processed at the initiator.
Figure 6:
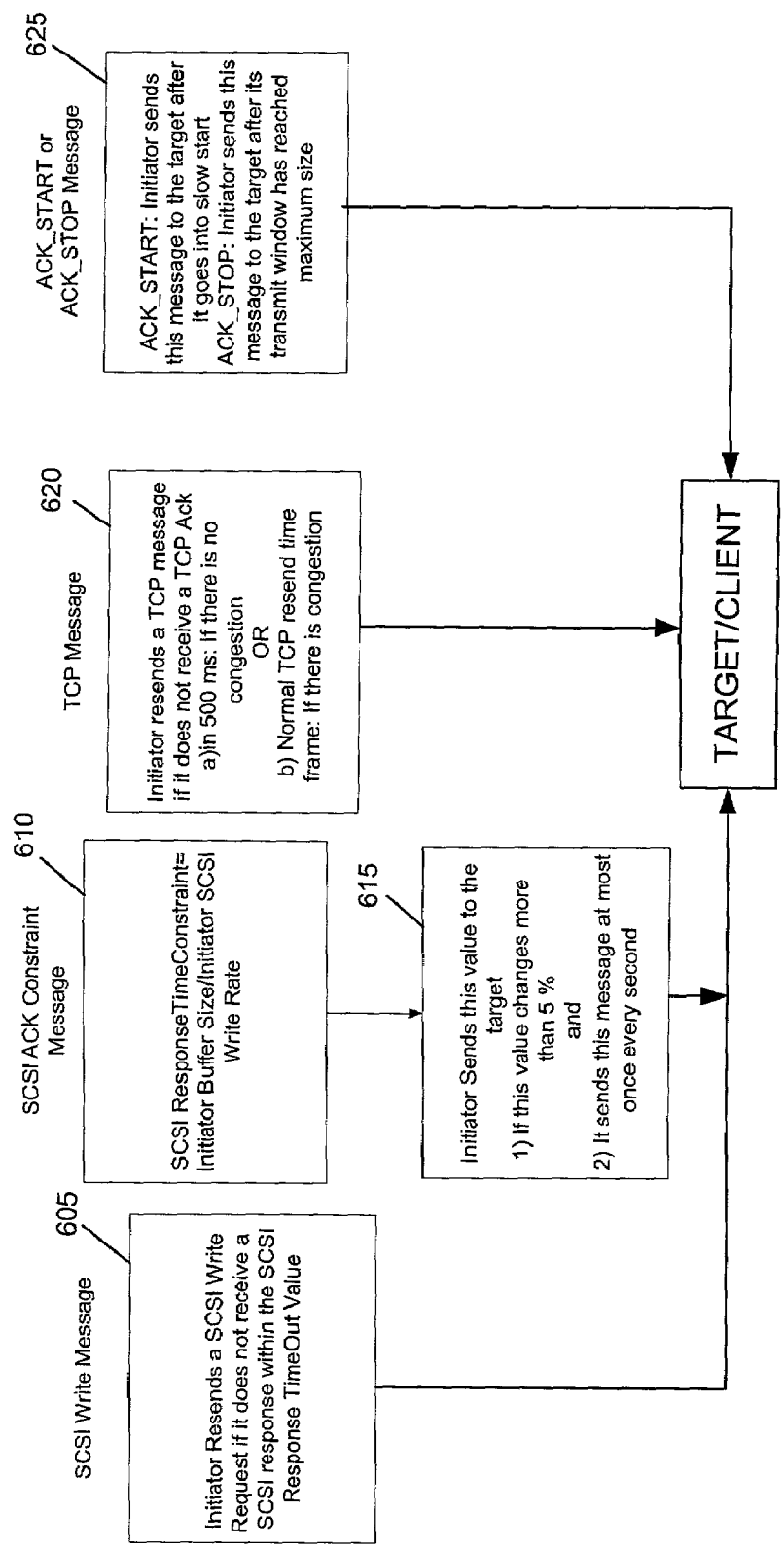
FIG. 6 is a flow chart that illustrates a capture algorithm processed at the target.

FIG. 4 displays the solution combining SCSI ACKs and TCP ACKs. FIGS. 5 and 6 describe the processing performed at the target and initiator, respectively, in order to combine TCP and SCSI ACKs. TCP ACKs are sent by the target to indicate that the data is successfully received. SCSI ACKS are sent to the client to indicate the completion of the write operation. Thus, TCP ACKS can be delayed at the target and piggybacked along with the SCSI ACKs. (block 530, FIG. 5) Since the TCP/IP ACK is also used for flow control purposes, the SCSI ACK is now also being used for flow control.

Existing internet standards constraint state that the TCP ACKs cannot be delayed by more than 500 milliseconds. Therefore, the receiver can delay sending immediate TCP ACKs, and wait for the completion of the SCSI write operation (block 535, FIG. 5), provided this is done within the 500 milliseconds limit. The receiver will then piggyback the TCP ACKs along with the SCSI completion messages to be sent to the source.

If the SCSI write operation consumes more than 500 milliseconds, then the target will have to send an explicit TCP ACK to the source within the 500 millisecond deadline (block 540, FIG. 5). Furthermore, if the initiator detects the presence of congestion, that is packets have been dropped in the network, then the initiator reduces its transmit window according to the TCP slow start rule. The initiator incrementally expands the transmit window upon receiving successive positive TCP ACKs from the target.

Therefore, during the period of congestion, the initiator (e.g., client) informs the target (e.g., server) to not delay sending the TCP ACK messages as described above (block 505, FIG. 5). When the initiator transmit window has reached its maximum size, then it informs the target to again delay sending the TCP ACKs by combining them with the SCSI ACKs.

In the current architecture, the source will try to retransmit the data if it does not receive an ACK back from the target within the specified retransmission time-out value (RTO). Currently, the RTO value is based on the round-trip time of a message sent from the source to the target, and it can not exceed an upper limit imposed by the standards.

The source retransmission timer needs to be modified to account for the write operation at the target, if TCP ACKs are delayed. This means the RTO value needs to be incremented by 500 milliseconds. If adding the 500 milliseconds to the RTO value makes the RTO value greater than the TCP standards imposed upper limit on the RTO, then the RTO value is only increased by the value of the RTO upper limit minus the current RTO value. The target also sends explicit ACKs to the source within this limit (RTO upper limit-current RTO value).

If the initiator detects a congestion, then after it sends a message to the target indicating that it is experiencing congestion (block 625, FIG. 6), and it has received a TCP ACK for this message, the initiator reduces the RTO value by 500 ms. This allows the initiator to quickly resend data to the target with the expectation of quickly reaching its maximum transmit window size. The initiator resends a Write Command if there is a TCP transmission timeout (block 620, FIG. 6), or if there is a SCSI level timeout (block 605, FIG. 6).

Thus, greatly reducing the transmission of explicit TCP ACKs, and by piggybacking on the SCSI ACKS helps reduce the CPU utilization at both the source and the target. Which, in turn, helps improve the overall throughput of the system. FIG. 5 shows the reduction in the number of messages exchanged between the client and the server over time.

FIG. 4 also displays the solution for the problem described above, namely "Coalescing of SCSI ACKs". FIGS. 5 and 6 describe the processing performed at the target and the initiator, respectively, in order to coalesce SCSI ACKs and combine them with TCP ACKs. The SCSI responses can be coalesced at the target to minimize the number of explicit responses that are sent to the initiator.

However, the time the target should wait before it sends the cumulative SCSI response is dependent on the rate at which the data is arriving from the source. Since the source only flushes its TCP buffers upon receiving the TCP ACK from the target, delaying the sending of SCSI responses/TCP ACK combination will reduce the available buffer space at the source. This, in turn, can reduce the data transfer rate at the source.

Therefore, the target sends SCSI responses to the source according to the amount of free buffer space available at the source. The source sends the SCSI response time constraint (T) to the target (block 515, FIG. 5). The source calculates this time constraint (T) by dividing the total source buffer space by the rate of SCSI writes arriving at the source (block 610, FIG. 6). The source sends this time constraint (T) to the target if this value changes more than 5% and it sends this message at most only once every one second (block 615, FIG. 6). The target ensures that a SCSI response is sent to the initiator before the elapse of T units of time.

When the SCSI response for a particular write operation is sent to the initiator (blocks 545, 555, FIG. 5), SCSI responses for all of the subsequent completed writes whose SCSI responses are queued at the target are also sent (piggybacked). The coalescing of SCSI responses helps to reduce the number of explicit TCP messages (carrying SCSI responses) that the target needs to send to the source (block 560, FIG. 5). This reduces the CPU utilization at both the source and the target devices, and this, in turn, improves the overall system throughput.

In addition, since the TCP ACK messages are being combined with SCSI responses, the target cannot wait to batch the SCSI responses for a time period that is longer than 500 milliseconds (block 550, FIG. 5). That is, 500 milliseconds is the upper bound for the amount of time the target can wait in order to coalesce the SCSI responses, and the initiator buffer space usage rate can lead to a time which is smaller than 500 milliseconds.

The coalescence of SCSI ACKs helps reduce the number of explicit TCP messages (carrying SCSI ACKs) that the target needs to send to the source. This reduces the CPU utilization at both the source and the target devices, and, in turn, improves the overall system throughput.

It is noteworthy to emphasize that while the protocols discussed in describing the present invention are the SCSI storage protocol, and the TCP/IP wide-area network protocol, the present invention is similarly applicable to any storage area network protocol operating over a reliable wide-area network protocol with acknowledgments.

Figure 7:
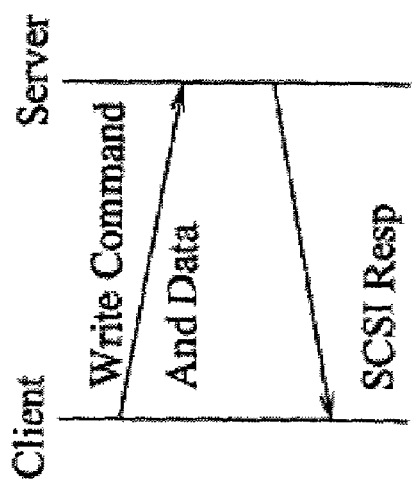
FIG. 7 illustrates the extra latency present in a RTT enabled system according to the present invention, versus a system with no RTTs.
Figure 7:
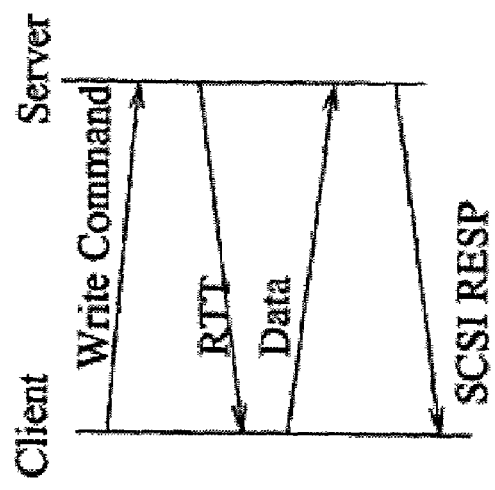

If the target buffer is contended, and the source data is discarded by the target, then the SCSI layer can rely on the underlying TCP/IP layer to facilitate for the source to resend its data to the target. FIG. 7 helps illustrate how the absence of RTTs reduces the overall latency of the write operations.

However, a key problem with the TCP/IP congestion control mechanism is that the sender's data transmission window (the amount of data that the sender can send before it waits for an acknowledgment (ACK) message from the target) is reduced if either the sender times-out waiting for an ACK, or if there is a missing ACK message.

Figure 8:
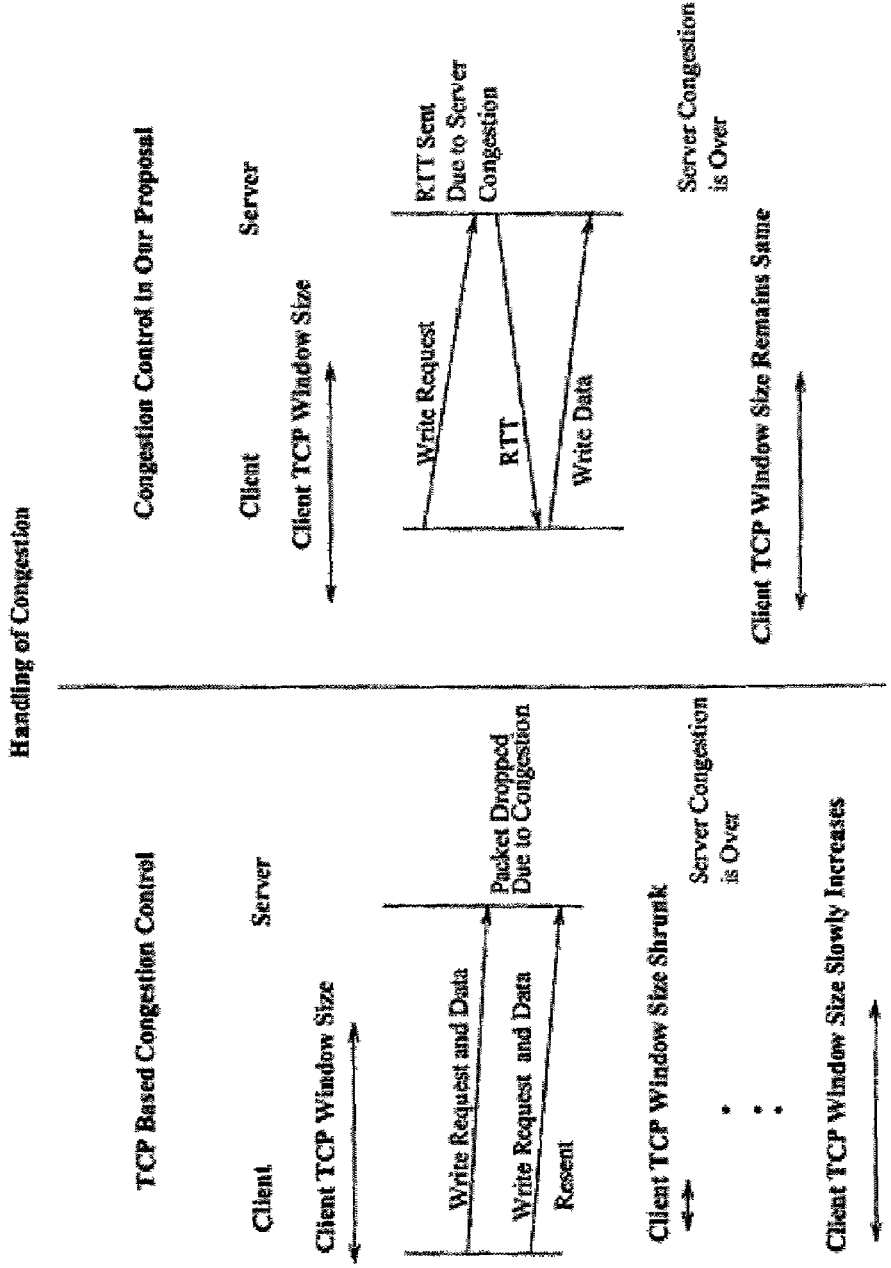
FIG. 8 illustrates a transmit window size degradation in a system with no RTT messages versus a system with RTT messages according to the present invention.

In both cases, the sender transmission window size is only increased upon receiving subsequent ACKs from the target. Hence, it takes the source some time to once again start transmitting data at its peak rate. FIG. 8 helps illustrates how the absence of RTT mechanism is a drawback because it takes the initiator some time before it can send data at the maximum rate again. Therefore, the present invention describes a dynamic RTT mechanism that allows a source and a target to turn off the RTT mechanism when the target buffer is not contended, and to turn back on the RTT mechanism when the target buffer is contended.

Figure 9:
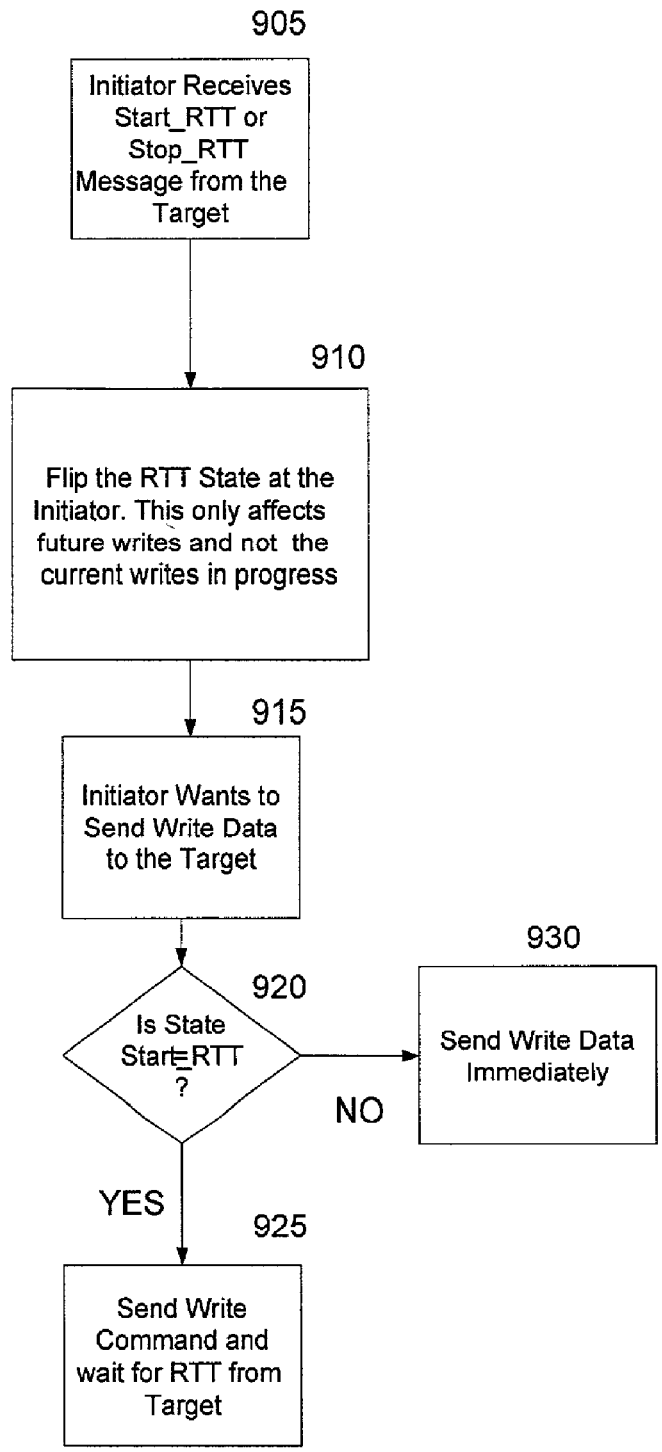
FIG. 9 is a flow chart that illustrates an algorithmic processing at the initiator.
Figure 10:
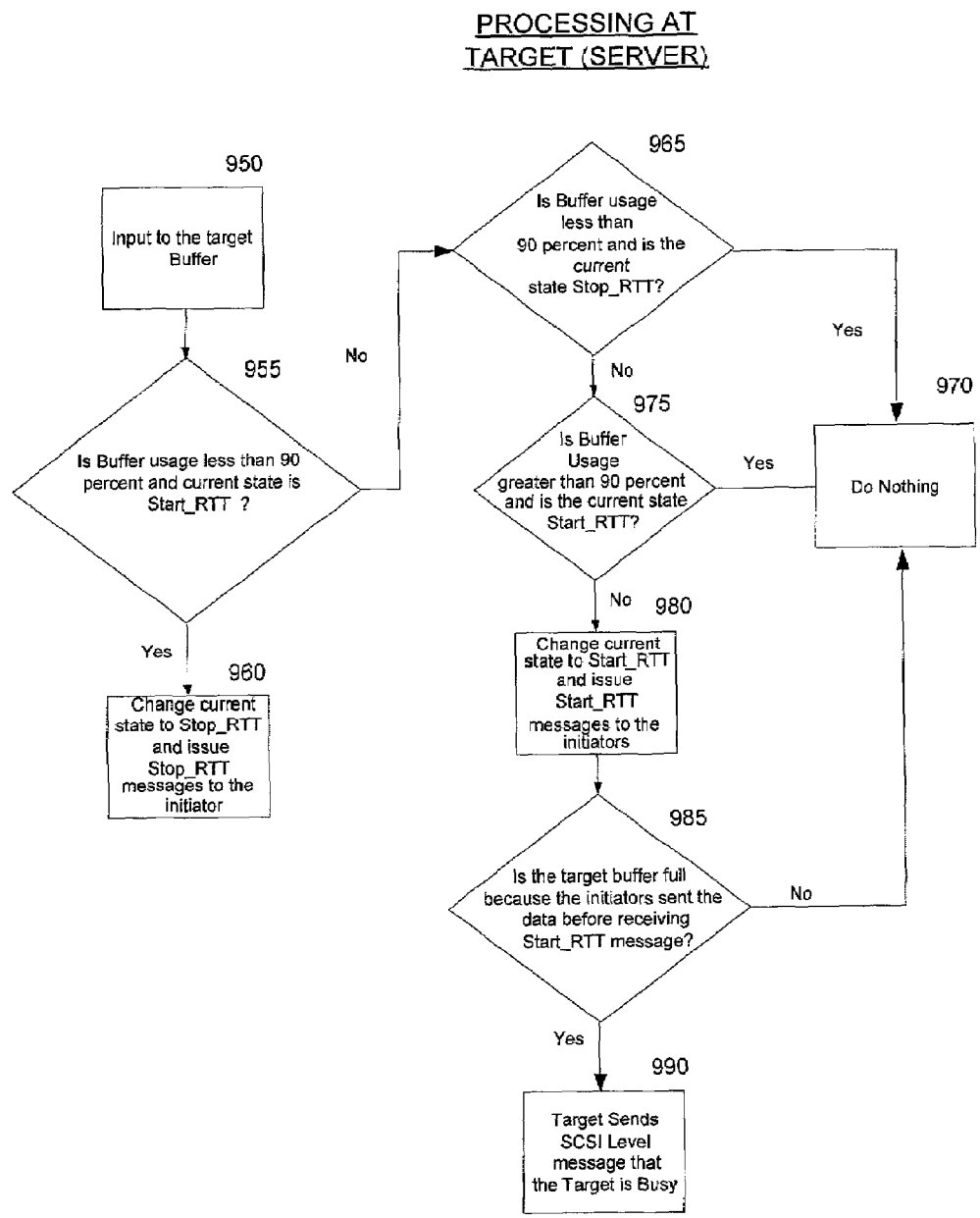
FIG. 10 is a flow chart that illustrates an algorithmic processing at the target.

FIGS. 9 and 10 present the processing performed at the initiator and the target respectively to implement the dynamic RTT algorithm. By default, the source and the target do not use the RTT mechanism. However, when the target detects that 90 percent of its buffer space is actively being used (buffer frames are pinned and are not free), then the target sends a START_RTT message and asks all of the active sources that are currently interacting with it, to start using the RTT mechanism.

With reference to FIG. 9, upon receiving this message from the target, the source starts using the RTT mechanism for all the subsequent, write messages (blocks 905, 910, 915, 920, 925). Any write operations that are pending at the source before it is receiving the START_RTT message will ignore this message (block 930), and will be processed as before. That is, the source sends the Write Data along with the Write Command to the server.

However, for write operations that have not yet been initiated by the source, the Write Data does not accompany the Write Command. Instead, the source sends a Write Command to the target, and then waits for the RTT message from the target before it can send the Write Data to the target. Once the buffer usage at the target goes down below 90 percent, the target sends STOP_RTT message to all of its sources. The source can then ignore the RTT mechanism, and will start sending the Write Data along with the Write Command for all subsequent write operations.

Referring now to FIG. 10, the dynamic RTT mechanism provides the flexibility for the source and the target to only use the RTT mechanism during target buffer contention. To ensure that there is no system thrashing behavior around 90 percent, that is, the target buffer usage value is becoming greater than and smaller than 90 percent in rapid sequence, the target sends the STOP_RTT message to the initiators either if the buffer usage value is lower than 85 percent, or if the buffer usage value is lower than 90 percent for 10 seconds (blocks 950, 955, 960). Similarly, the target sends the START_RTT if the buffer usage value is greater than 95 percent or if the buffer usage value is greater than 90 percent for 10 seconds (blocks 965, 970, 975, 980, 985, 990). This prevents system thrashing behavior by reducing the number of START_RTT and STOP_RTT messages even if the buffer usage value oscillates around 90 percent.

FIG. 8 shows the advantage of the current invention, whereby the sender transmission window size remains constant. By using the RTT mechanism, the source sends the Write Command to the target. It then waits for an RTT reply message indicating that the target has enough buffer storage to accept the data. Upon receiving the RTT message, the source sends the write data.

While detailed descriptions of specific embodiments of the present invention have been provided, it would be apparent to those reasonably skilled in the art that numerous variations are possible in which the concepts of the present invention may readily be applied. The descriptions provided herein are for the sake of illustration and are not intended to be exclusive.

What is claimed is:

1. A method of improving backup performance of block storage over a network with asymmetric traffic, comprising:
    a client concurrently sending a write command and associated data to a server;
    the server executing the write command, and suppressing a SCSI Ready to Transfer (RTT) message, if any SCSI RTT message is scheduled to be issued by the server;
    the server combining a protocol acknowledgment message with the delayed SCSI RTT message into an acknowledgment message, and transmitting the combined acknowledgment message to the client; and
    upon receipt of the combined acknowledgment message, the client recognizing a successful execution of the write command by the server and de-allocating a buffer that contains the associated data.

2. The method of claim 1, wherein the server further selectively delays an issuance of the protocol acknowledgment message from the server to the client.

3. The method of claim 2, wherein the protocol acknowledgment message is a TCP/IP acknowledgment message.

4. The method of claim 3, wherein the combined acknowledgment message is a combined SCSI/TCP/IP acknowledgment message.

5. The method of claim 2, wherein the client sends a sequence of asynchronous write commands to the server.

6. The method of claim 5, wherein the server delays the issuance of a combined SCSI/TCP/IP acknowledgment message for each of the write commands.

7. The method of claim 6, wherein the server further merges combined SCSI/TCP/IP acknowledgment messages for at least some of the write commands into a batch SCSI/TCP/IF acknowledgment message.

8. The method of claim 7, wherein the server sends the batch SCSI/TCP/IP acknowledgment message to the client.

9. The method of claim 8, wherein in response to the batch SCSI/TCP/IP acknowledgment message, the client de-allocates buffers associated with the at least some of the write commands.

10. The method of claim 2, wherein the server transmits the combined acknowledgment message to the client before an expiration of a predefined acknowledgment constraint window.

11. The method of claim 10, wherein the predefined acknowledgment constraint window is approximately 500 msec.

12. The method of claim 2, further including the step of instructing the client to delay resending the write command and associated data to the server.

13. The method of claim 12, wherein the instructing step comprises adding a predetermined delay interval to a round trip time.

14. The method of claim 13, wherein adding the predetermined delay interval comprises adding approximately 500 msec to the round trip time.

15. The method of claim 1, wherein, upon detecting congestion, the server does not delay the issuance of the protocol acknowledgment message to the client.

16. The method of claim 15, wherein the server detects congestion by receiving a notification from the client.

17. The method of claim 16, wherein the notification from the client comprises a message indicating a rate at which client buffers are getting full.

18. The method of claim 1, wherein the network comprises a wide area network.

19. The method of claim 1, wherein the network comprises a local area network.

20. A computer program product having a plurality of executable instruction codes stored on a computer-readable medium, for improving backup performance of block storage over a network with asymmetric traffic, the computer program product comprising:

a first set of instruction codes concurrently sending a write command and associated data to a server;

a second set of instruction codes residing on the server, for executing the write command, and delaying transmission of a SCSI Ready to Transfer (RTT) message, if any SCSI RTT message is scheduled to be issued by the server, to within a predetermined timeout constraint, in order to reduce the number of RTT messages from the server to the client;

a third set of instruction codes residing on the server, for combining a protocol acknowledgment message with the delayed SCSI RTT message, into an acknowledgment message, and transmitting the combined acknowledgment message to a client; and upon receipt of the combined acknowledgment message, a fourth set of instruction codes residing on the client, for recognizing a successful execution of the write command by the server and de-allocating a buffer that contains the associated data.

21. The computer program product of claim 20, wherein upon recognizing a successful execution of the write command by the server, the client de-allocates a buffer that contains the data.

22. The computer program product of claim 21, wherein the server monitors a buffer consumption; and if the buffer consumption exceeds a predetermined level, a fifth set of instruction codes residing on the server sending a message to the client, instructing the client to delay sending the data to the server.

23. The computer program product of claim 22, further comprising a sixth set of instruction codes for instructing the client to await a RTT message prior to sending the data to the server.

24. The computer program product of claim 22, wherein the predetermined level is approximately 90% of a total server buffer capacity.

25. The computer program product of claim 23, wherein if the buffer consumption is below the predetermined level, on eight set of instruction codes residing on the server sending a message to the client, instructing the client to not delay sending the data to the server.

26. The computer program product of claim 21, wherein a ninth set of instruction codes residing on the server selectively delaying an issuance of the protocol acknowledgment message from the server to the client.

* * * * *